United States Patent [19]
Chin

[11] Patent Number: 5,852,607
[45] Date of Patent: Dec. 22, 1998

[54] ADDRESSING MECHANISM FOR MULTIPLE LOOK-UP TABLES

[75] Inventor: Hon Wah Chin, Palo Alto, Calif.

[73] Assignee: Cisco Technology, Inc., San Jose, Calif.

[21] Appl. No.: 806,636

[22] Filed: Feb. 26, 1997

[51] Int. Cl.[6] .................................................. H04L 12/56
[52] U.S. Cl. ........................................ 370/401; 370/392
[58] Field of Search ..................... 370/389, 397, 370/399, 401, 402, 400, 403, 404, 405, 522, 395, 432, 469, 392

[56] References Cited

U.S. PATENT DOCUMENTS

| | | | |
|---|---|---|---|
| 4,680,700 | 7/1987 | Hester et al. | 711/206 |
| 4,691,281 | 9/1987 | Furui | 711/207 |
| 4,972,338 | 11/1990 | Crawford et al. | 711/206 |
| 5,430,856 | 7/1995 | Kinoshita | 711/209 |
| 5,465,337 | 11/1995 | Kong | 711/207 |
| 5,490,258 | 2/1996 | Fernner | 711/1 |
| 5,497,469 | 3/1996 | Sakata et al. | 711/203 |
| 5,555,387 | 9/1996 | Branstad et al. | 711/209 |
| 5,617,554 | 4/1997 | Alpert et al. | 711/208 |

OTHER PUBLICATIONS

G. P. Chandranmenon and G. Varghese, "Trading Packet Headers for Packet Processing," Proc. ACM SIGCOMM '95, Boston, MA, Sep. 1995, pp. 162–173.

*Primary Examiner*—Chau Nguyen
*Assistant Examiner*—Kenneth Vanderpuye
*Attorney, Agent, or Firm*—Cesari and McKenna, LLP

[57] ABSTRACT

A hash table addressing mechanism enters multiple, overlaid look-up tables with a hash table address that corresponds to an X-bit index J that includes both bits associated with a V-bit identifier that selects the appropriate overlaid table, and a Y-bit identifier that hashes to an X-bit index I that selects the appropriate location within the selected table. The table includes hash bins with locations that contain Y-bit identifiers that map under the hash function to the same index I. For each addressed location the system compares the stored identifier with only the Y-bit identifier used to produce the index I, to determine which of the table locations is associated with both the Y-bit identifier and the V-bit identifier that were used to produce the hash table address.

25 Claims, 4 Drawing Sheets

ADDRESSING MECHANISM FOR MULTIPLE LOOK-UP TABLES

FIELD OF THE INVENTION

This invention relates generally to addressing mechanisms for look-up tables, and in particular, to an addressing mechanism for multiple look-up tables.

BACKGROUND OF THE INVENTION

The invention is described in the context of network switches, which use the invention as part of an address translation mechanism. The invention may, however, be used in any system that uses multiple, associated look-up tables, as discussed below. Before discussing the invention we discuss the operation of switches in general.

A network switch of a data communications network transfers information, such as data packets, among entities of the network. Typically, the switch is a computer comprising a collection of components (e.g., cards) interconnected by a backplane of wires. Each card may include a limited number of ports that couple the switch to the other network entities over various types of media, such as Ethernet, FDDI or token ring connections. A network entity may consist of any device that "sources" (i.e., transmits) or "sinks" (i.e., receives) data packets over such media. The network is physically segmented by local area networks or "LANs" that connect the various network entities to the switch.

The switching function provided by the switch typically comprises receiving data at a source port from a network entity, transferring the data over the backplane to a destination port and, thereafter, transmitting that data over a medium to another entity of the network. In many cases, the switch transfers the data to more than one port.

A switch, such as that described in U.S. Pat. No. 5,561,669, which is incorporated herein by reference, transfers the data packets between and among ports that are part of a segmented network in which a packet may be sent to all entities, a particular entity, or to a group of entities that together form a network segment. The switch includes a number of packet processors, one for each of its ports. The packet processors determine where to transfer the received data packets based on information contained in the packets, such as source and/or destination address information.

The packet processor in the prior switch includes a filter table, which is a look-up table that essentially contains packet routing information. To determine how to access the filter table, the processor uses an X-bit index "I", which is mathematical manipulation of, for example, the Y-bit packet destination address information. The processor then withdraws from the table the routing information that directs the packet to the appropriate port or ports, and further to the appropriate network entities. In the prior switch, the filter table is part of a hash table, which is entered with a hash table address that is a 1s complemented and shifted version of the X-bit index I.

The hash table addresses "hash bins," which are linked lists of filter table locations. Each entry in the filter table includes a Y-bit destination address, a pointer to the next entry in the linked list and the packet routing information. All entries in the same hash bin include destination addresses that map under the hash function to the same hash index I. To determine if a particular filter table entry is the appropriate one, the switch compares the destination address contained in the addressed table location with the Y-bit destination address that was used to produce the hash index I. If the two destination addresses match, the switch uses the packet routing information contained in the table entry. Otherwise, the switch uses the pointer contained in the entry to enter the next location on the linked list, and again compares the Y-bit destination address in this table entry with the Y-bit packet destination address. If these addresses do not match, the pointer in this entry is used to enter to the next location on the list, and so forth until either the destination addresses match or the list ends, i.e., the pointer in the table location is all zeros. If there are N locations in the hash bin, i.e., N locations on the linked list, the switch performs up to N comparisons, each involving two Y-bit values.

The packet processors in the prior switch efficiently transfer packets over the segmented network, with each destination—either a single entity or multiple entities of a LAN—identified entirely by the Y-bit destination address. We have improved the switch to operate in an environment that also includes virtual networks, or "VLANs," which are arrangements that virtually, rather than physically, associate any number of entities with any number of groups of entities within the network. VLANs, which are also referred to is as "domains," are discussed in more detail in copending patent application Ser. No. 08/261,393 Extended Domain Computer Network Using Standard Links, which is assigned to the same assignee and is incorporated herein by reference. In networks that include VLANs, the complete source and destination information includes the source address, the Y-bit destination address, and also a V-bit VLAN identifier. The VLAN identifier may be included in the packet or it may be determined by the port through which the packet enters the switch.

Prior switches may instead use content addressable memories, or "CAMs," to determine how to route the received packets. In such switches the source and/or destination address information is used directly to retrieve the routing information from the CAM.

Known systems that have updated their switches to operate with VLANs have revised their memory addressing schemes to use as the address the Y-bit destination address and an appended V-bit VLAN identifier. These systems must thus store the Y+V-bit addresses in the CAMs and use more complicated memory control circuitry.

Similarly, if the Y-bit identifier address and the appended V-bit VLAN identifier is instead used as the look-up key for a hash table, the hash table has to be enlarged to store the longer keys in each table location. Further, more complicated table control circuitry is required, to manipulate the longer keys and perform Y+V-bit comparisons.

The inclusion of the VLAN identifiers in the information that is used to direct the packets essentially results in a segmentation of the hash table, by membership in the respective VLANs. This segmentation is actually an overlaying of multiple tables, one for each of the VLANs.

Our improvement to the prior, "non-VLAN" switch includes a table or memory addressing scheme that uses the same size hash table as the prior switch and yet allows the switch to direct data packets to and among the entities associated with the various VLANs.

The inventive table addressing mechanism may also be used in any system that must be updated to address multiple look-up tables or tables that are segmented by additional addressing information, as is discussed in more detail below. Further, this addressing mechanism may be used in any system that must be updated to handle longer identifiers or look-up keys, such as telephone systems that must be updated to, for example, include extra digits in a long distance telephone number.

SUMMARY OF THE INVENTION

The identifiers, or look-up keys, used by the addressing mechanism each consist of two parts, namely, a part A that was previously used to address the table and a part B that is the additional information that is now also required to address multiple look-up tables. In the example of the switch, part A is the destination address information and part B is the VLAN identifier. As discussed in more detail below, the VLAN identifier is an essential piece of information for correctly directing a packet through the switch to the intended entity or entities.

The addressing mechanism mathematically manipulates part A of the look-up key in the same manner as it previously did, to produce an X-bit hash index "I" that selects a first location in a linked list, or first entry in a hash bin, within a table. The mechanism then combines the X-bit index I with part B of the look-up key, to produce a final X-bit hash index "J" from which the system determines a hash table address that also directs the processor to the particular table associated with the identified VLAN.

The addressing mechanism produces different table addresses for data packets that contain the same destination address and different VLAN identifiers, as long as the total number of VLANs is smaller than the over-all size of the table, i.e., less than $2^X$.

Once a hash bin is chosen from the appropriate table, the system next determines which of the pointers contained in the bin to use to enter the filter table. Since the V-bit identifier selects the table, it need not be included in the comparison operations that involve the contents of the hash bin that is chosen from that table. The system thus compares just the Y-bit destination address, or the part A of the look-up key, with the stored pointers and designates the matching pointer as the appropriate one. This means that the updated switch performs the same Y-bit look-up key comparisons as the prior switch, and thus, that the hash table can be the same size as that in the prior switch. The filter table must updated, however, to include the routing information for the various VLANs.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
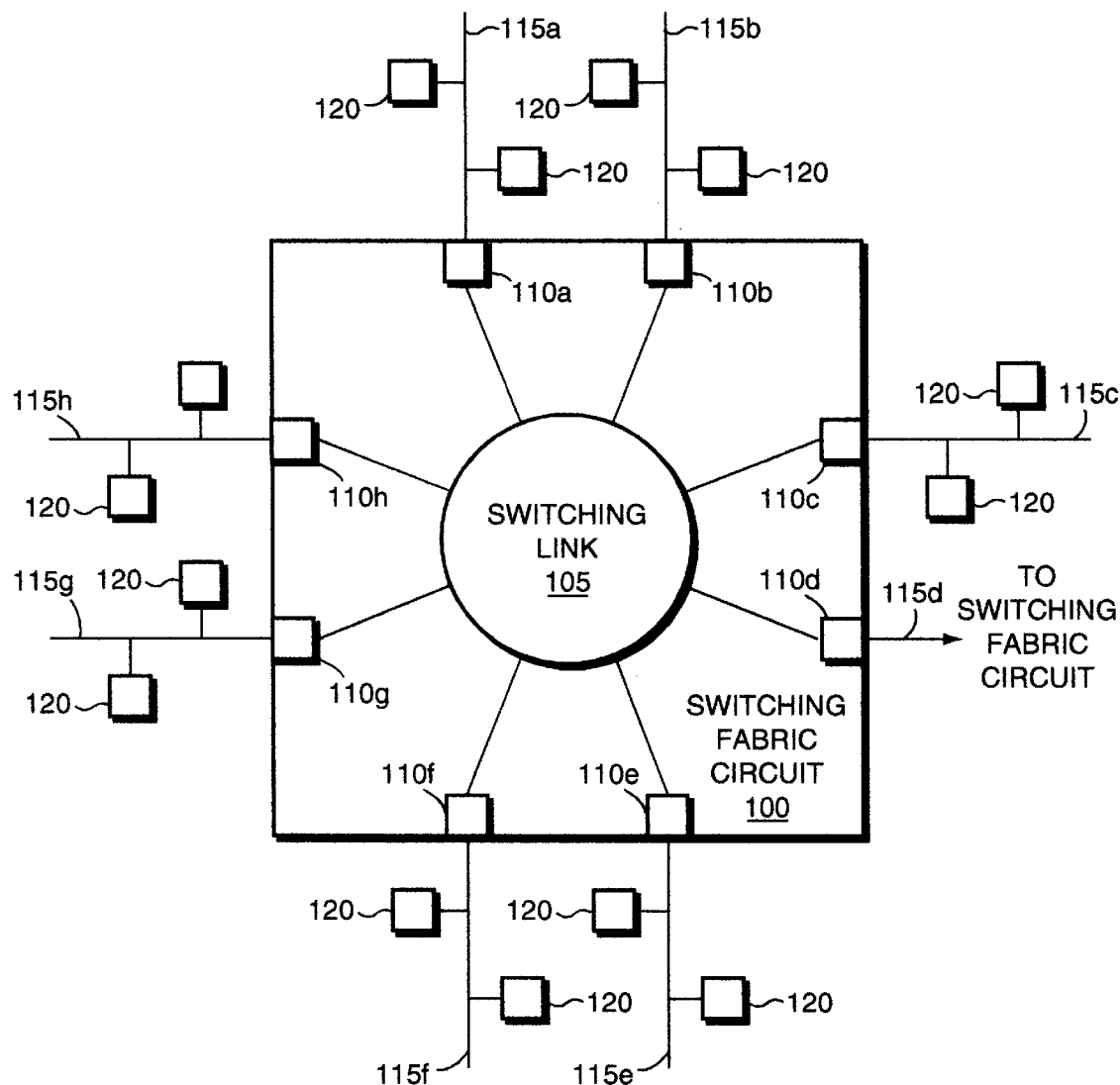
FIG. 1 is a functional block diagram of a network that includes a switch that is constructed in accordance with the invention.

FIG. 1 shows a switching fabric circuit 100 that includes eight ports 110a–110h and a switching link 105. The switching link 105 is coupled to each of the ports 110a–110h and provides a communications path so that each port 110 may share information with every other port, as discussed in U.S. Pat. No. 5,561,669.

Each of the ports 110a–110h is coupled to a corresponding one of LAN segments 115a–115h. For example, port 110a is coupled to the LAN segment 115a, port 110b is coupled to the LAN segment 115b, etc. Each LAN segment 115 comprises a physical data link such as a coaxial cable, twisted pair wire, or optical fiber, and the ports 110a–110h provide the appropriate electrical interface between the switching link 105 and the LAN segments 115a–115h. Each of the ports 110a–110h may also be associated with one or more VLANs. For example, ports 110a, 110b and 110h may each be part of the one VLAN, and ports 110b and 110c may be part of a different VLAN.

There may be one or more endstations 120 coupled to each LAN segment 115. Alternatively, a LAN segment 115 may be provided as a link between the switching fabric circuit 100 and another switching fabric circuit (not shown) that includes various endstations and network connections. The switching fabric circuit 100 interconnects the endstations of the various LAN segments to form a segmented network. Typically, each of the endstations 120 coupled to the LAN segments 115a–115h has a unique address that is globally defined for the segmented network. This address is referred to as a media access control or "MAC" address.

Communications between endstations that are coupled to the same LAN segment 115 may proceed without the switching fabric circuit 100; however, communications between endstations of different LAN segments necessarily involve the operation of the switching fabric circuit 100. An endstation that is the source of a data packet for transfer is called the "source endstation," and a port that receives a data packet for transfer to another port via the switching link 105 is called a "port of entry" or a "source port." An endstation that is the destination of a data packet is called a "destination endstation," and a port that receives a data packet via the switching link 105 is called a "port of exit" or a "destination port."

A data packet typically includes both a source address field and a destination address field. The source address field contains the network address of the source endstation for the frame. The content of the destination address field depends on the type of transaction. A "unicast" transaction is a network transaction in which the destination address field of the frame indicates a single destination endstation. Multicast and broadcast transactions are directed to sets of endstations or to all endstations, respectively, and are indicated by associated destination addresses. Each packet may also include a VLAN identifier that further defines to which endstations the packet is to be transferred. The VLAN identifier, for example, may limit the number of endstations that will receive a multicast packet by specifying that the stations must be members not only of the designated multicast population but also of the indicated VLAN.

The switching link 105 monitors each data packet that is transferred on each LAN segment 115 and determines which data packets are broadcast packets, multicast packets, or unicast packets having destinations that are remote from the port of entry. The switching link then directs the data packets to the appropriate port or ports of exit.

Figure 2:
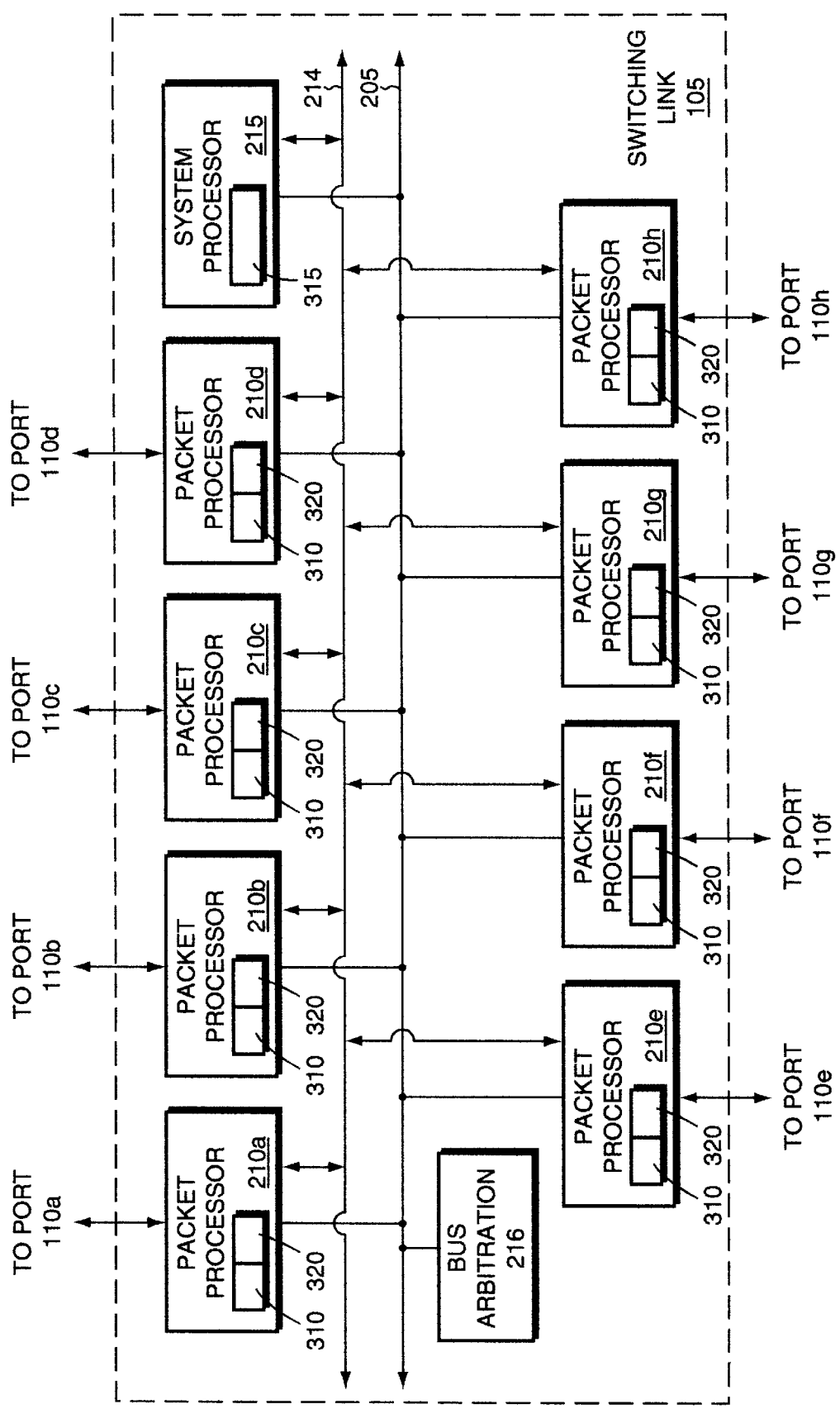
FIG. 2 is a functional block diagram of the switch of FIG. 1.

FIG. 2 shows the switching link 105 in greater detail. Switching link 105 includes a switching bus 205, a multiplicity of packet processors 210a–210h, a system processor 212, a processor bus 214, and bus arbitration circuitry 216. Packet processors 210a–210h are coupled to corresponding ports 110a–110h. For example, the packet processor 210a is coupled to the port 110a, the packet processor 210b is coupled to the port 110b, etc. The packet processors 210a–210h provide the communications protocol interfaces between the LAN segments 115a–115h and the switching link 105. The bus arbitration circuitry 216 controls access to the switching bus 205, and is not discussed further herein.

System packets are the mechanism by which communications between the ports 110 are handled. A system packet contains a received data packet and a system packet header that includes routing information for forwarding the data packet through the switch to the various network entities. The packet processor at the port of entry generates the system packet header from routing information that is stored in its filter table 310, which contains entries for each of the known network endstations.

The system processor 215 maintains a master filter table 315 for the switching fabric circuit and updates the local filter tables 310 via the processor bus 214, as needed.

The packet processor enters the filter table 310 using an address that a table addressing subsystem 320 produces from information contained in the received data frame. Using the information that it needs from the table, it produces the system packet header and appends the header to the received data packet to produce the system packet. The table addressing subsystem 320 is discussed in more detail with reference to FIG. 3 below. The ports of exit respond to the system packet header by transferring the data packet to the appropriate network entities.

Figure 3:
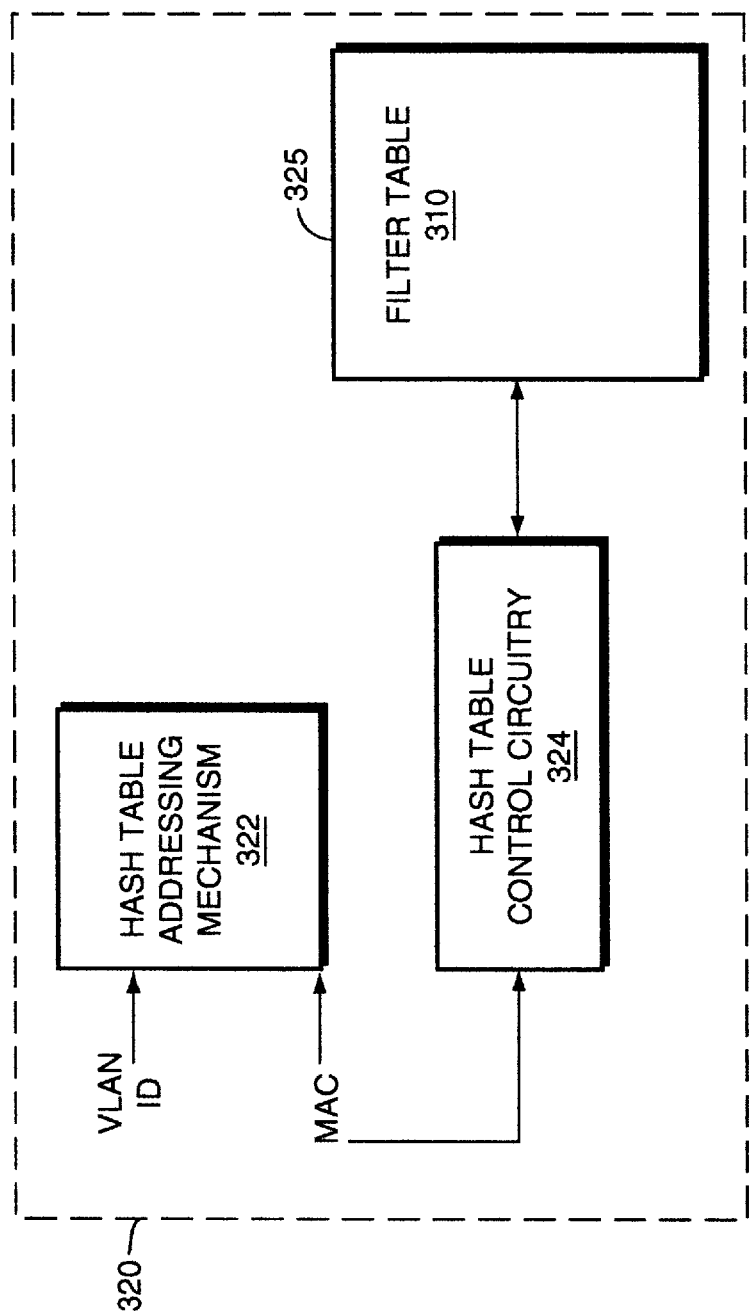
FIG. 3 is a functional block diagram of an address subsystem that is part of the switch of FIG. 1.

Referring now to FIG. 3, the table addressing subsystem 320 includes a hash table addressing mechanism 322, and table control circuitry 324. The table control circuitry 324 enters the filter table 310 using an address that is produced by the addressing mechanism 322. The filter table is arranged as hash bins, or linked lists of locations. Each location includes destination address information, a pointer to a next location on the list and packet routing information. The locations that are in the same hash bin, or part of the same linked list, each contain a destination address that maps to the same hash index I. The hash table addressing mechanism selects a hash bin by producing the address of the first location in the linked list. As discussed below, the table control circuitry then determines which of the linked filter table entries is the appropriate one.

The filter table 310 consists of a set of overlaid look-up tables, one table for each VLAN. The multiple tables are overlaid in the memory area 325 designated for the look-up table. In the non-VLAN switch the memory area contains a single look-up table rather than a set of overlaid tables.

In the non-VLAN switch a hash table addressing mechanism produces the table address by mathematically manipulating the 48-bit MAC address that is contained in the destination address field of a received frame. The mechanism manipulates the 48-bit MAC address in accordance with a hash function, to produce a 12-bit hash index, "I". It then takes the 1s complement of the index I and shifts the result, to produce the table address that selects the appropriate hash bin, as discussed in more detail below with reference to FIG. 4.

In the switch 100, the index I is further manipulated by combining it with the VLAN identifier that is included in the received packet, as discussed below with reference to FIG. 4. The result is a 12-bit index "J" that is used to form the table address that enters the appropriate one of the multiple overlaid look-up tables of the filter table 310, and selects the appropriate hash bin from that table.

Figure 4:
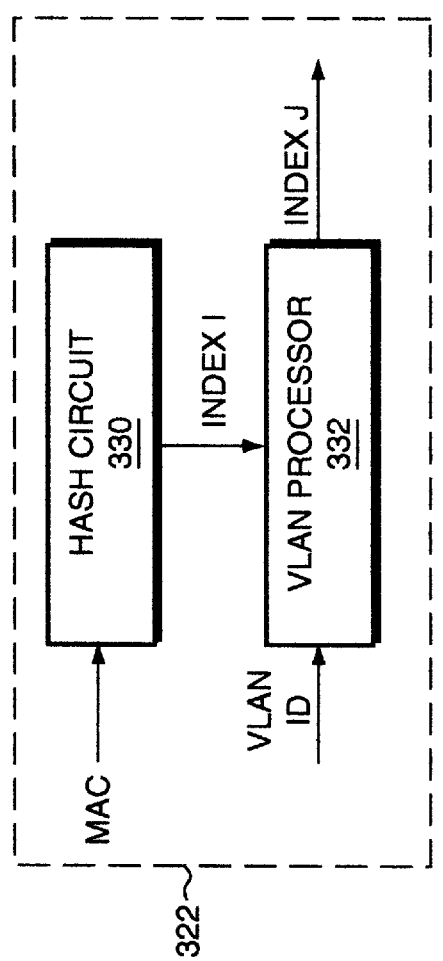
FIG. 4 is a functional block diagram of a hash table address mechanism that is part of the address subsystem of FIG. 3.

Referring now also to FIG. 4, the hash table addressing mechanism 322 includes a hash circuit 330 that produces the index I. The hash circuit manipulates the 48-bit MAC address contained in the destination address field of the received packet in accordance with a hash function H(x). First, the hash circuit 330 segments the 48-bit MAC address into four 12bit words:

| 35 | 34 | 33 | 32 | 47 | 46 | 45 | 44 | 43 | 42 | 41 | 40 |
| 31 | 30 | 29 | 28 | 27 | 26 | 25 | 24 | 39 | 38 | 37 | 36 |
| 23 | 22 | 21 | 20 | 19 | 18 | 17 | 16 | 15 | 14 | 13 | 12 |
| 11 | 10 | 9  | 8  | 7  | 6  | 5  | 4  | 3  | 2  | 1  | 0  | where the numbers represent bit positions. It then XORs the corresponding bits in the four 12-bit words, to produce the 12-bit index I. As discussed above, in the non-VLAN switch the processor takes the ones complement of the index I and shifts the result once to the left, to produce the hash table address.

To produce an address for the multiple hash tables of the VLAN switch 100, a VLAN identifier processor 332 combines the 12-bit index I and the 10-bit VLAN identifier that is contained in the VLAN identifier field of the received packet. In the example, the processor performs modulo $2^{12}$ addition and adds the VLAN identifier and the 12-bit index I, to produce the 12-bit index J that is used to select and enter one of the multiple, overlaid look-up tables of filter table 310. Alternatively, the processor may XOR the VLAN identifier and the index I, or it may subtract the VLAN identifier from the index I. Before performing the adding, XORing or subtracting operations, the processor may first manipulate a selected number of bits of the VLAN identifier, for example, by combining or shifting them, to produce a V-bit result that is then used in the operations in place of the VLAN identifier. The processor may perform any function that produces a unique index J for each of the destination addresses that are associated with different VLANs. For example, the processor may add to the index I the VLAN identifier, or V bits that are a manipulation of the bits of the VLAN identifier, using modulo $2^Q$ addition, where $2^Q$ is the number of VLANs.

If the system takes the 1s complement of the index I, as discussed above, it does so before it adds the VLAN identifier. If the system shifts the index, it does so after the VLAN identifier is added.

Once the 12-bit index J is produced, it is used by the table control circuitry 324 to select the appropriate table and enter a hash bin in that table. Since the address produced from the 12-bit index J has the same number of bits as the address produced from the 12-bit index I, the switch 100 may use same table control circuitry as is used in the non-VLAN switch.

The table control circuitry 324 next withdraws from the first location in the selected hash bin the 48-bit MAC address that is contained therein. It then compares that address with the 48-bit MAC address used to produce the index I. If the two MAC addresses match, the processor uses the packet routing information contained in the selected location to form the system packet. If the two MAC addresses do not match, the table control circuitry uses the pointer included in the selected location, to address the next location in the hash bin. The table control circuitry then performs the MAC address comparison using the 48-bit MAC address contained in this next location. The table control circuitry continues to enter the locations on the linked list until either the two compared MAC addresses match, or the last location in the hash bin has been entered, i.e., the location that contains an all-zero pointer has been entered.

Since the same 48-bit MAC address comparisons are made in this switch 100 as are made in the non-VLAN switch, the same comparison circuitry may be used. Further, since the VLAN identifiers are not included in the comparison operations, they need not be stored in the filter table—and the same size table as is used in the non-VLAN switch is used in the switch 100. The switch 100, with its added capability to operate with VLANs, is thus produced from the non-VLAN switch with minimal hardware changes.

In response to the receipt of a data packet with the same destination address, the hash circuit produces the same index I. It produces a different index J, however, if the packets include different VLAN identifiers—as long as the number of VLANs is less than the total number of entries in the hash table. The system thus enters different look-up tables, i.e., selects a hash bin from different sets of bins, depending on the particular VLAN identified in the received frame. Once the appropriate table is selected using the address produced from the index J, the system can choose the appropriate entry from the addressed hash bin using only the destination address information. Accordingly, the look-up key stored in the table need not include the VLAN identifier information.

The table addressing subsystem 320 can be used in any system that requires the addressing of multiple, associated look-up tables. It may be used in switches that use ATM VPI/VCI look-up tables, which distinguish VPI/VCIs on a per port basis. In such switches a P-bit port identifier is used instead of the V-bit VLAN identifier.

In networks in which end stations do not currently insert VLAN identifiers, the identifiers may be inserted by ports that connect these stations with other switching fabrics. In such networks the table addressing subsystem 320 is effective in handling all received packets in essentially the same way, using a VLAN identifier of all zeros for those packets that do not include the identifiers. Alternatively, the switch may include the table addressing mechanism in only those port processors that are associated ports that connect to other switching fabrics, such as, for example, port processor 210$d$ in FIG. 2.

Another example of a system that may use the table addressing mechanism 320 is a telephone system that is updated to identify telephone numbers by local numbers plus area codes rather than just by local numbers. This is in contrast to systems that use the longer telephone numbers as the look-up keys, and must thus store more information in the look-up tables or CAMs. The table addressing mechanism may be used to update the telephone switches in countries in which telephone numbers have been lengthened by a prepended digit from t to t+1 digits in order to create more telephone numbers. The table addressing mechanism 320 allows the switches to distinguish between old and new telephone numbers that have the same t trailing digits, with minimal hardware changes to the switch

What is claimed is:

1. In a system that includes multiple overlaid look-up tables, a table addressing system including:
   A. a processor for producing a first X-bit index based on Y bits of a Y+V–bit identifier, the X-bit index being associated with the selection of a table entry;
   B. means for producing a second X-bit index by combining the first X-bit index with V bits that are associated with the remaining V-bits of the Y+V–bit identifier, said means adding the V bits using modulo $2^Q$ addition, the second X-bit index being associated with a particular one of the multiple overlaid look-up tables.

2. The system of claim 1 wherein the V bits that are combined with the first X-bit index are the remaining V bits of the Y+V–bit identifier.

3. The system of claim 1 wherein $2^Q$ is the number of overlaid look-up tables.

4. The system of claim 1 wherein the Q of the modulo $2^Q$ addition is equal to X.

5. A system including:
   A. multiple look-up tables, each of the respective tables being associated with a V-bit identifier and including information that relates to Y+V–bit identifiers;
   B. a hash processor for producing a first X-bit index that is a hash of the Y-bits of the Y+V–bit identifier which are not part of the V-bit identifier,
   C. means for producing a second X-bit index by combining V bits that are associated with the V-bit identifier with the first X-bit index; and
   D. table control circuitry that uses the second X-bit index to (i) enter the table that is associated with the V-bit identifier, and (ii) select therefrom a table location that is associated with the Y bits of the Y+V–bit identifier.

6. The system of claim 5 wherein the means for producing the second X-bit index adds the V-bit identifier to the first X-bit index using modulo $2^Q$ addition.

7. The system of claim 6 wherein $2^Q$ is the number of overlaid look-up tables.

8. The system of claim 6 wherein the Q of the modulo $2^Q$ addition is equal to X.

9. The system of claim 5 wherein the means for producing the second X-bit index subtracts the V bits from the first X-bit index using modulo $2^Q$ subtraction, where $2^Q$ is the number of overlaid look-up tables.

10. The system of claim 5 wherein the means for producing the second X-bit index subtracts the V bits from the first X-bit index using modulo $2^x$ subtraction.

11. The system of claim 6 wherein the V bits that are combined with the first X-bit index are the remaining V bits of the Y+V–bit identifier.

12. The system of claim 5 wherein the means for producing the second X-bit index XORs the V bits and the first X-bit index.

13. The system of claim 5 wherein:
   the table address selects a hash bin that is associated with stored Y-bit values that map to the first index; and
   the system selects the appropriate one of the stored Y-bit values by comparing the stored values with the Y-bit value used to produce the first index.

14. A network switch that transfers data packets between ports, some of which are members of one or more virtual local area networks, or VLANs, the switch including:
   A. n multiple look-up tables that contain information related to the routing of the data packets, the individual tables being associated, respectively, with one of the VLANs;
   B. means for producing an address for the look-up tables, said means including:
      i. a hash processor for producing a first X-bit index from a hash of information in the destination address field of the data packet; and
      ii. means for producing a second X-bit index, the means combining the first X-bit index with V bits that are associated with a V-bit VLAN identifier that is included in a VLAN identifier field of the data packet; and
      iii. means for producing a table address from the second X-bit index; and
   C. table control circuitry for using the table address to enter the look-up table that is associated with the VLAN identifier and select therefrom a table location that is associated with the destination address.

15. The network switch of claim 14, wherein the information used by the hash processor is a 48-bit media access control address.

16. The network switch of claim 15, wherein the hash processor includes:

a. means for segmenting the 48 bits into four 12 bit words;

b. combination means for combining corresponding bits of each of the words to produce a first 12-bit index, said means combining corresponding bits of the words

| 35 | 34 | 33 | 32 | 47 | 46 | 45 | 44 | 43 | 42 | 41 | 40 |
|----|----|----|----|----|----|----|----|----|----|----|----|
| 31 | 30 | 29 | 28 | 27 | 26 | 25 | 24 | 39 | 38 | 37 | 36 |
| 23 | 22 | 21 | 20 | 19 | 18 | 17 | 16 | 15 | 14 | 13 | 12 |
| 11 | 10 | 9  | 8  | 7  | 6  | 5  | 4  | 3  | 2  | 1  | 0  | where the numerals indicate bit positions.

17. The network switch of claim 14, wherein the means for producing the second X-bit index combines the first 12-bit index with a 10-bit VLAN identifier to produce a second 12-bit index.

18. The network switch of claim 17, wherein the means for producing second X-bit index further combines the index and the identifier by modulo $2^{12}$ addition.

19. The network switch of claim 14, wherein the means for producing the second X-bit index combines the first X-bit index and the V bits by modulo $2^Q$ addition.

20. The network switch of claim 14, wherein the means for producing the second X-bit index combines the first X-bit index and the V bits by modulo $2^x$ addition.

21. The network switch of claim 14, wherein the means for producing the second X-bit index combines the first X-bit index and the V bits by modulo $2^n$ addition.

22. The network switch of claim 14, wherein the means for producing the second X-bit index combines the V bits and the first X-bit index by modulo $2^x$ subtraction.

23. The network switch of claim 14, wherein the means for producing the second X-bit index combines the V bits and the first X-bit index by modulo $2^n$ subtraction.

24. The network switch of claim 14, wherein the means for producing the second x-bit index XORs the V bits and the first X-bit index.

25. The network switch of claim 14, wherein the means for producing the second X-bit index manipulates the V bits of the VLAN identifier and combines the result with the first X-bit index.

* * * * *